(12) United States Patent
Bashev et al.

(10) Patent No.: US 10,671,250 B2
(45) Date of Patent: Jun. 2, 2020

(54) CONTROLLING A DEVICE USING A RADIAL GRAPHICAL USER INTERFACE

(71) Applicant: LIMITED LIABILITY COMPANY "PEERF", Moscow (RU)

(72) Inventors: Vladimir Nikolaevich Bashev, Nizhnij Novgorod (RU); Nikolay Olegovich Ilyin, Moscow (RU)

(73) Assignee: LIMITED LIABILITY COMPANY "PEERF", Moscow (RU)

( * ) Notice: Subject to any disclaimer, the term of this patent is extended or adjusted under 35 U.S.C. 154(b) by 0 days.

(21) Appl. No.: 16/325,395

(22) PCT Filed: Aug. 1, 2017

(86) PCT No.: PCT/RU2017/050067
§ 371 (c)(1),
(2) Date: Feb. 14, 2019

(87) PCT Pub. No.: WO2018/034596
PCT Pub. Date: Feb. 22, 2018

(65) Prior Publication Data
US 2019/0196673 A1    Jun. 27, 2019

(30) Foreign Application Priority Data
Aug. 15, 2016    (RU) .................... 2016133452

(51) Int. Cl.
*G06F 3/0482* (2013.01)
*G06F 3/0481* (2013.01)
(Continued)

(52) U.S. Cl.
CPC .......... *G06F 3/0482* (2013.01); *G06F 3/0481* (2013.01); *G06F 3/04845* (2013.01);
(Continued)

(58) Field of Classification Search
CPC ...................................................... G06F 3/0482
(Continued)

(56) References Cited

U.S. PATENT DOCUMENTS

| 6,448,987 B1 * | 9/2002 | Easty | G06F 3/0482 715/834 |
| 6,538,635 B1 * | 3/2003 | Ringot | G06F 3/0482 345/156 |

(Continued)

FOREIGN PATENT DOCUMENTS

| RU | 2450320 C2 | 5/2012 |
| RU | 2519559 C2 | 6/2014 |

*Primary Examiner* — Reza Nabi
(74) *Attorney, Agent, or Firm* — Dmitry S. Kryndushkin

(57) ABSTRACT

The claimed invention relates to controlling electronic devices using a graphical user interface. The claimed method of controlling an electronic device using a radial graphical user interface includes the following steps: generating a radial interface in the form of a central region, containing at least one interface element, and at least one auxiliary region with interface elements arranged on elliptical arcs relative to the central region, wherein the element of the central region is related by a hierarchical relationship at least to interface elements of one of the auxiliary regions and represents a higher level of an interface tree consisting of N nodes, while the elements of the auxiliary region correspond to interface elements of a subsequent lower level; identifying user interaction with an interface element in an auxiliary region; moving said interface element into the central region and generating an image of one or more interface elements of the next N level of the hierarchy which are related to said element of the auxiliary region on an elliptical arc of the auxiliary region, or performing the action related to said interface element.

20 Claims, 11 Drawing Sheets

(51) Int. Cl.
*G06F 3/0484* (2013.01)
*G06F 3/0354* (2013.01)
*G06F 3/0488* (2013.01)
*G06F 3/0489* (2013.01)

(52) U.S. Cl.
CPC ........ *G06F 3/03543* (2013.01); *G06F 3/0489* (2013.01); *G06F 3/04886* (2013.01)

(58) Field of Classification Search
USPC ........................................................ 715/834
See application file for complete search history.

(56) References Cited

U.S. PATENT DOCUMENTS

| | | | | |
|---|---|---|---|---|
| 6,847,387 | B2* | 1/2005 | Roth | G06F 3/0482 715/738 |
| 7,036,091 | B1* | 4/2006 | Nguyen | G06F 3/0482 348/E5.002 |
| 7,091,998 | B2* | 8/2006 | Miller-Smith | G06F 3/0362 345/156 |
| 7,093,201 | B2* | 8/2006 | Duarte | G06F 3/0482 715/810 |
| 7,137,075 | B2* | 11/2006 | Hoshino | G06F 3/04815 715/848 |
| 7,406,661 | B2 | 7/2008 | Vaananen et al. | |
| 7,418,674 | B2* | 8/2008 | Robbins | G06T 11/206 715/764 |
| 8,245,156 | B2 | 8/2012 | Mouilleseaux et al. | |
| 2002/0033849 | A1 | 3/2002 | Loppini et al. | |
| 2002/0054117 | A1* | 5/2002 | van Dantzich | G06F 3/0482 715/766 |
| 2004/0100479 | A1* | 5/2004 | Nakano | G06F 1/1626 715/700 |
| 2004/0155907 | A1* | 8/2004 | Yamaguchi | G06F 3/0481 715/810 |
| 2004/0221243 | A1* | 11/2004 | Twerdahl | G06F 3/016 715/834 |
| 2005/0278656 | A1* | 12/2005 | Goldthwaite | G06F 16/64 715/810 |
| 2006/0212829 | A1* | 9/2006 | Yahiro | G06F 3/0482 715/810 |
| 2008/0168368 | A1* | 7/2008 | Louch | G06F 3/048 715/764 |
| 2008/0307369 | A1* | 12/2008 | Liu | G06T 11/206 715/855 |
| 2009/0106696 | A1* | 4/2009 | Duarte | G06F 3/0482 715/828 |
| 2009/0164944 | A1* | 6/2009 | Webster | G06F 3/0489 715/838 |
| 2009/0327955 | A1* | 12/2009 | Mouilleseaux | G06F 3/04812 715/810 |
| 2010/0088618 | A1* | 4/2010 | Mayer-Ullmann | G06F 40/14 715/763 |
| 2010/0211919 | A1* | 8/2010 | Brown | G06F 3/04817 715/863 |
| 2010/0214243 | A1* | 8/2010 | Birnbaum | G06F 3/016 345/173 |
| 2010/0333029 | A1* | 12/2010 | Smith | G06F 3/0486 715/834 |
| 2012/0226978 | A1* | 9/2012 | Harberts | G06F 3/0482 715/702 |

* cited by examiner

Radial Menu Elements Tree:

- Element 101 (Root)
  - Element 201
  - Element 202
  - Element 203
  - Element 204
    - Element 2041
    - Element 2042
      - Element 20411
      - Element 20412
  - Element 204N
  - Element 205
    - Element N

Figure 5

CONTROLLING A DEVICE USING A RADIAL GRAPHICAL USER INTERFACE

FIELD OF THE INVENTION

The declared invention relates to the data handling, in particular to the method and control system of electronic devices by means of graphical user interface.

BACKGROUND

At present time, usage of graphical user interface is a standard method of interaction between computer and human being.

Most interfaces, built on radial principle, have a predefined number of functions, that normally has significant restrictions. For example, there is a described graphical interface with many conditions (RU 2450320, Nokia Corporation, 10, May 2012), which is designated to optimize viewing area of display, which is constant and is effectively used, making possible to apply system of states' menu not only in devices with a large display but also in devices with a smaller display.

This known interface represents a circular active menu for selection various device states, which are displayed in a given screen area.

The principal weakness of such solution is a limited functional optimization of control of multiple interface elements due to both static zone of interface location and a lack of hierarchic changing of interface-interconnected components, which results to a limited number of device administration functions. At that, on selection one or more functions in circle menu, when changing menu state its functional elements are changing, that also results to an augmentation of interaction time with a menu, in case a certain device function or application needs to be activated.

There is a declared radial menu (U.S. Pat. No. 8,245,156, Apple Inc., 14, Aug. 2012), which represents on a display several submenu of radial form, representing potential functions variants and states of the chosen part of main radial menu.

The main drawbacks of such realization are a limited selection of possible functions and states available for activation on additional menu and sufficiently large size of administration zone on a screen of an electronic device, that first, increases a time of access to the necessary interface functions and second, makes such radial interface realization method absolutely unfit for usage in devices with a sensor display, not having a large diagonal.

BRIEF SUMMARY OF THE INVENTION

A mission of such invention is to eliminate existing limitations in a field of a user radial graphical interface for electronic devices administration and to create a new principle of organizing of control of interface multiple functional elements.

The invention will result to the increased efficiency of administration of multiple functional elements of user graphical interface due to minimization of essential effective area of the screen, necessary for the device control with a possibility to manage numerous interface elements and device functions.

Additional technical results are a reduction of access time to the device functions and an increase in interface operation speed due to usage of hierarchical interaction of interface elements.

The declared invention is carried out by mean of the electronic device administration system using a radial graphical user interface, which contains the following:
  at least one processor;
  at least one memory which contains machine-readable instructions, which are executed at least by one processor;
  generates a radial interface representing the main central zone, which contains at least one interface element and at least one auxiliary zone with interface elements located on elliptic arches relative to the central zone, while the mentioned element of the central zone is hierarchically connected at least with the interface elements of one of the auxiliary zones and represents a higher level of interface' tree composed of N nodes, and elements of auxiliary zone correspond to the interface elements of the following lower level;
  determines interaction of user with the interface element in the auxiliary zone;
  executes displacement of the mentioned activated interface element to the central zone,
and
  displays one or more interface elements of the following N hierarchical level, related to the mentioned activated element of the auxiliary zone, on elliptic arch of the auxiliary zone or carry out an action related to the mentioned interface element.

The claimed invention is realized also by means of the user electronic device administration method, which contains the following stages:
  generation of radial interface, representing the main central zone, containing at least one auxiliary zone with the interface elements located on elliptic arches in relation to the central zone while the mentioned element of the central zone is connected hierarchically at least with the interface elements of one of auxiliary zones and represents a higher level of interface' tree, composed of N nodes and elements of the auxiliary zone correspond to the interface elements of the following lower level;
  determining interaction of user with the interface element in the auxiliary zone;
  displacement of the mentioned activated interface element to the central zone,
and
  displaying one or more interface elements of the following hierarchical level N, related to the mentioned activated element of the auxiliary zone, on elliptic arch of the auxiliary zone or performs an action related to the mentioned activated interface element.

In one particular case of implementation, interface elements are selected from a group containing at least program applications, files, directories, settings, action function or their combinations.

In another particular case of implementation, the auxiliary radial zone is executed with a possibility to move elements along arch relative to the central zone.

In another particular case of implementation, an element of interface located in the central zone can be relocated anywhere on the device screen.

In another particular case of implementation, a quantity of simultaneously shown interface elements on the auxiliary field are determined at least on a base of a display resolution.

In another particular case of implementation, on activation element in the central zone, a transfer to the higher level N of interface hierarchy is executed.

In another particular case of implementation, an auxiliary zone is formed, corresponding to the selected level N of interface central zone element' hierarchy.

In another particular case of implementation, the central element of interface contains several functional modes related to type of user interaction with the mentioned element.

In another particular case of implementation, one of the interface' modes executes hiding or showing of all represented on a screen auxiliary zones of radial interface in respond to the user interaction.

In another particular case of implementation, the user interactions are executed by means of a manipulator of a mouse type, or by sensor display' touch, or by keyboard or by vocal commands.

BRIEF DESCRIPTION OF THE DRAWINGS

FIG. 5 illustrates an example of tree interface construction.

DETAILED DESCRIPTION OF THE INVENTION

Figure 1:
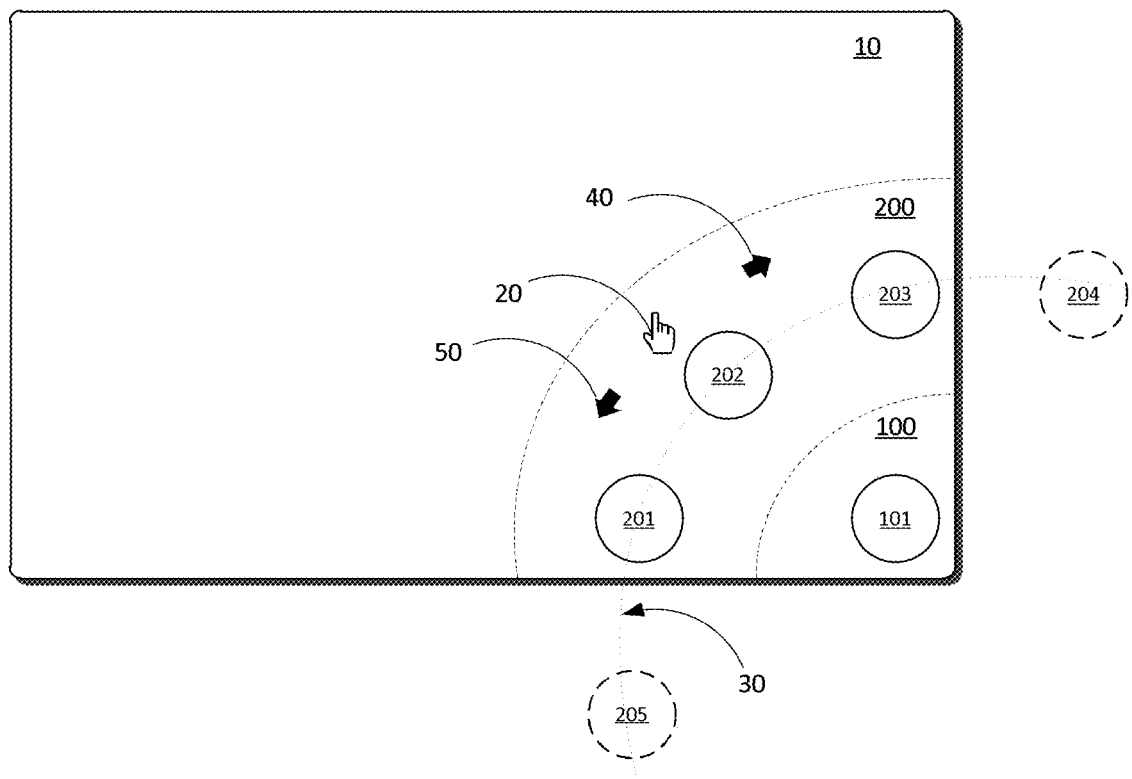
FIG. 1 illustrates a general interface view.

FIG. 1 represents a radial interface, shown on the screen (10) of the electronic computer device. Interface contains a central area (100), with one or more elements of interface located inside (101).

Interface elements (201)-(205) are hierarchy tree bound with the central element 120 (101) and located on auxiliary interface area (200). The auxiliary area (200) represents a display zone, which reflects elements for user interaction (201)-(203), and allows managing elements selection (201)-(205) by means of rolling of the area (200) in radial direction clockwise or anticlockwise.

Elements shifting (201)-(205) is done on virtual elliptic arch (30), which contains a number of elements corresponding to the particular N level of interface hierarchy.

The elements of interface in the present solution are program applications, files, folders, device functions, actions and directories, etc. Any element of interface, performing one or another device function can be realized by mean of the declared interface architecture.

As it is shown on the FIG. 1, the elements (204) and (205) are located outside the main visible screen area and when rolling elements in the area (200) the user has a possibility to select a necessary element by its positioning in a visible part of interface on electronic device' screen.

Functional elements (40) and (50) of interface are dedicated to the auxiliary execution of elements rolling in the area (200). In a general view, the user interaction is preferably performed with the help of sensor display and recognition of touch (20) in the area, necessary for activation of one or another interface element.

The declared interface can be also realized on non-sensor screens, for example on personal computer monitor or laptop. The interface can be also executed with a help of the interface projection by a projector, in this case the management will be realized by means of known types of manipulators, for example a "mouse" type, remote control unit, and etc.

The declared interface can be realized by means of any electronic computer device, containing at least one processor and a memory, which are suitable for processing machine-readable instructions for realization and functional provisioning of the declared redial interface. Such devices could be without limitations: mobile phones, smart phones, tablet PCs, fablets, laptops, personal computers, game consoles, projectors, IP phones, smart watches or any other type of electronic device, which enables to utilize the declared interface.

By interface implementation, one should understand not trivial procedure of a graphical interface display on device screen, but rather a utilization of necessary logical relations between the interface elements, which correspond to the data available on the device, which utilizes the mentioned interface, an organization of functional particularities of management of such elements with achieving of technical effect, revealed when generating and applying the declared interface.

Terms used in this application such as element "activation" and "user interaction" shall be understood as analogical notions, representing fulfillment of control interaction from user side with a declared interface, implemented on an electronic device.

Construction of virtual arch constituent (30) is generated basing on a central element location (101). An area size (200), same as a size of displayed elements (201)-(205) of an auxiliary area (200), can be determined basing on calculation of necessary size parameters based, for example, on a screen resolution.

Each element (201)-(205) on auxiliary area (200) can be tied by hierarchical relations connected to following the lower nesting level N of the interface tree.

Figure 2:
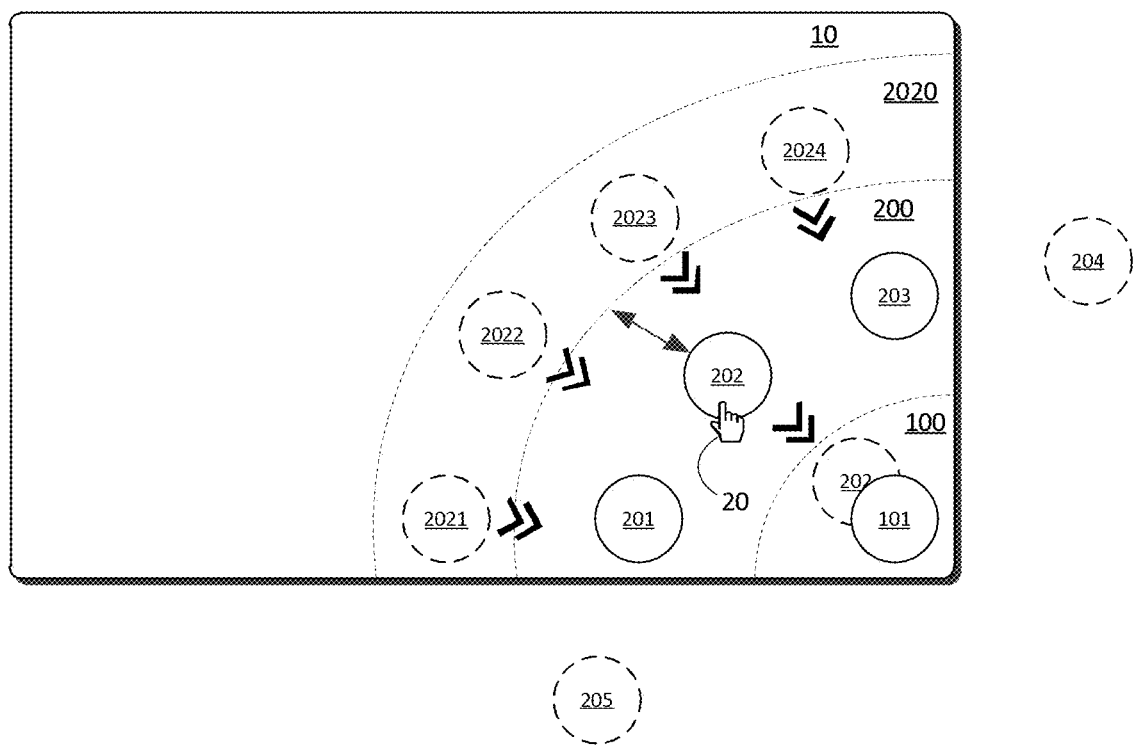
FIG. 2-FIG. 3 illustrate an example of interface elements replacement on radial zones.

As it is shown on the FIG. 2, when activating (20) interface element (202), having several elements (2021)-(2024), located in outer subarea (2020), which nests the activated element's (202) own zone (200), automatic relocation of the selected element (202) is done to the main central area (100).

Figure 3:
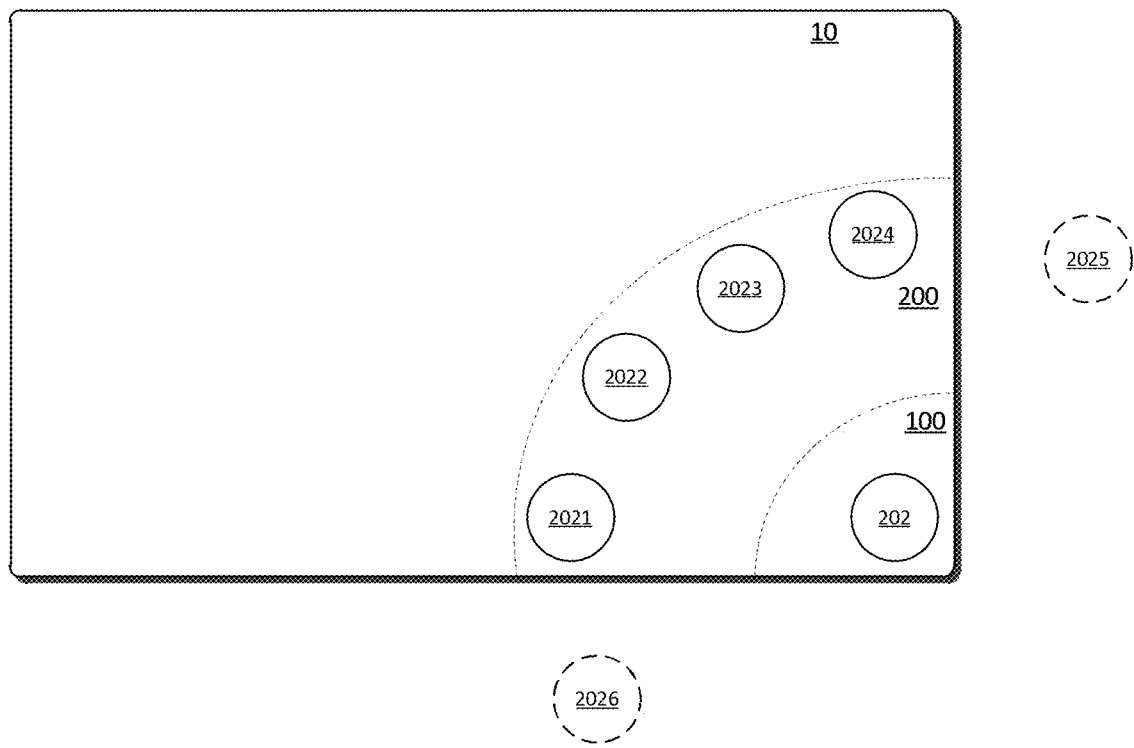

FIG. 3 represents a final interface state during element activation (202) on the auxiliary area (200). The activated element on the auxiliary area (200) replaces the central element (101) and is located in the central area (100). The subarea of nesting level N of the activated element (202) replaces elements, displayed inside it until its activation, by elements (2021)-(2024), corresponding the mentioned subarea (2020). The central area corresponds to the tree root node, which can dynamically change and move in such a way that the interface-activated element is always assigned as a root node, and the subsequent formation of one or more auxiliary areas is performed in relation to the hierarchically connected with such root node branches—the elements of subarea of the following nesting level N or functions being subject to activation when achieving the final node point (the branch end).

Such realization of the interface building process and device functions control gives possibility to minimize a necessary screen area for the device administration. With a help of this approach, the more effective administration of all program-realizing device functions can be done, such as control of files stored into the device memory or other actions, performed with a help of the electronic device interface.

When activating the element of interface, which is the final point of tree (final level N of hierarchy), an activation of a related action is done, which can be without limitations an application launching, corresponding to the interface element, executing a file (graphical, musical, etc.), activation of the device function (launching of wireless communication, memory emptying, etc.).

Figure 4:
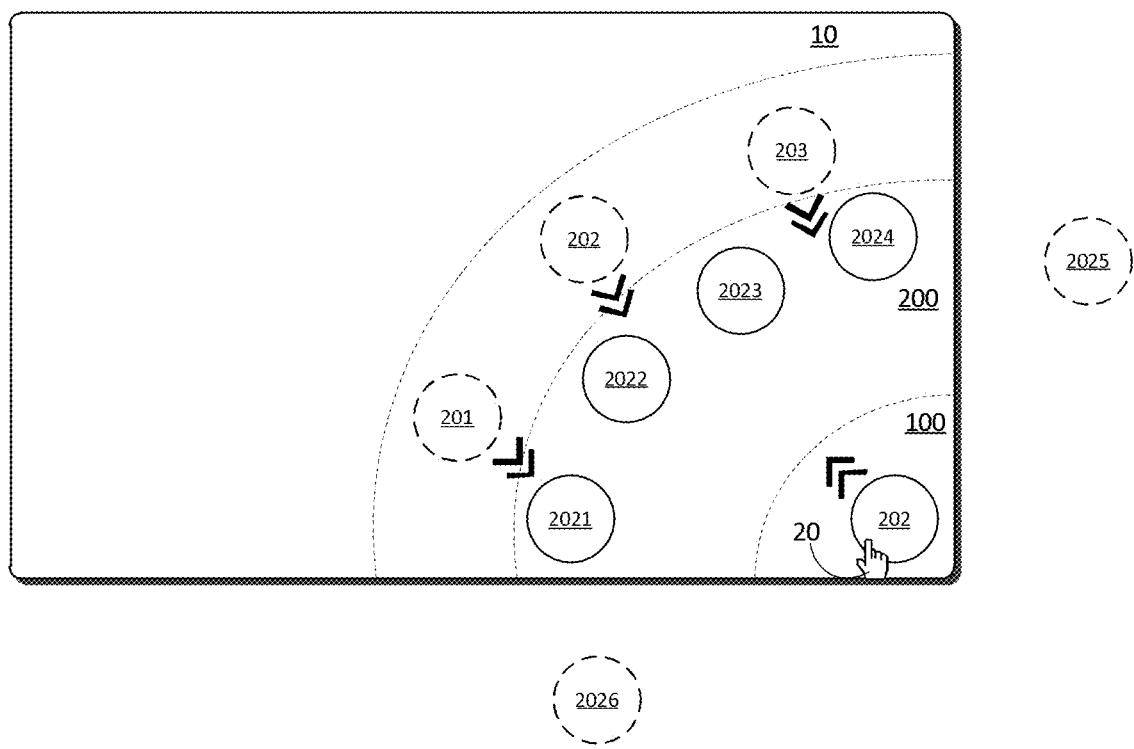
FIG. 4 illustrates an example of central element activation.

The FIG. 4 demonstrates a return to the previous condition of menu when activating the central element (202), so that a reverse transition up an interface tree to the previous nesting level N. A reverse substitution of interface elements is done on an auxiliary area (200) and a central area (100).

The FIG. 5 demonstrates an example of interface tree building with N nesting levels, providing as it was mentioned above that the tree root is dynamic and moves when activating one of hierarchy tree' elements.

Figure 6:
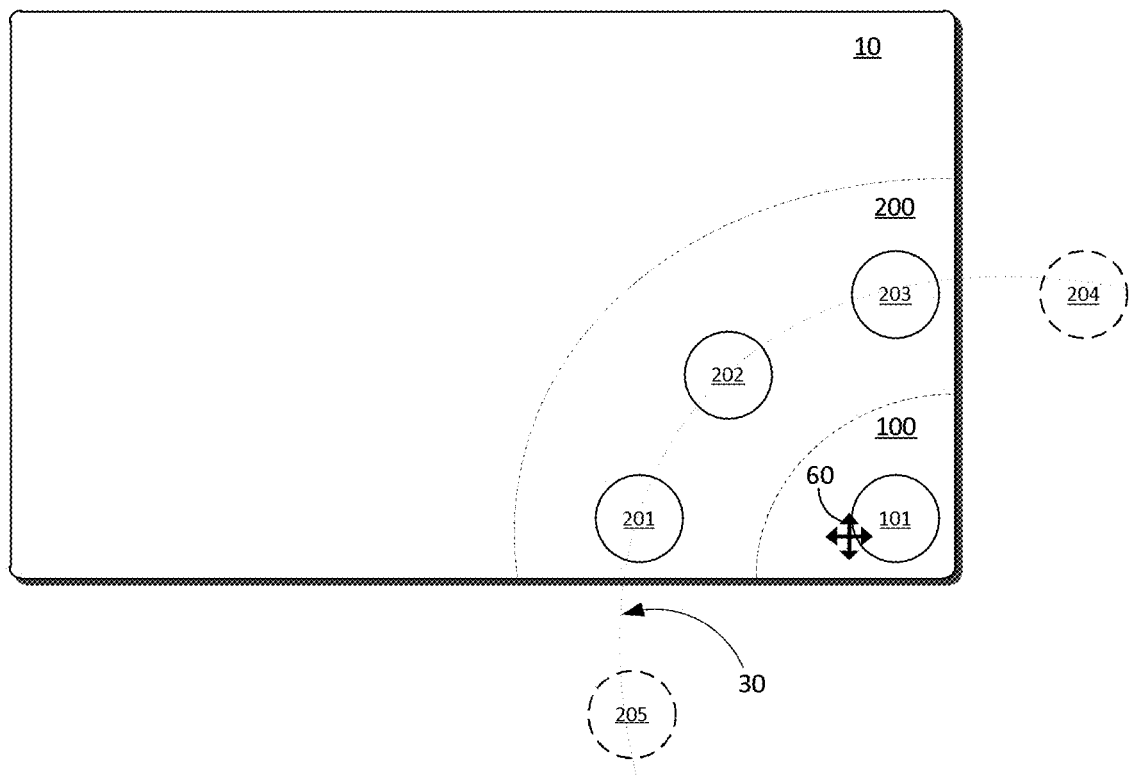
FIG. 6-FIG. 7 illustrate an example of interface central zone transfer on a no screen.
Figure 7:
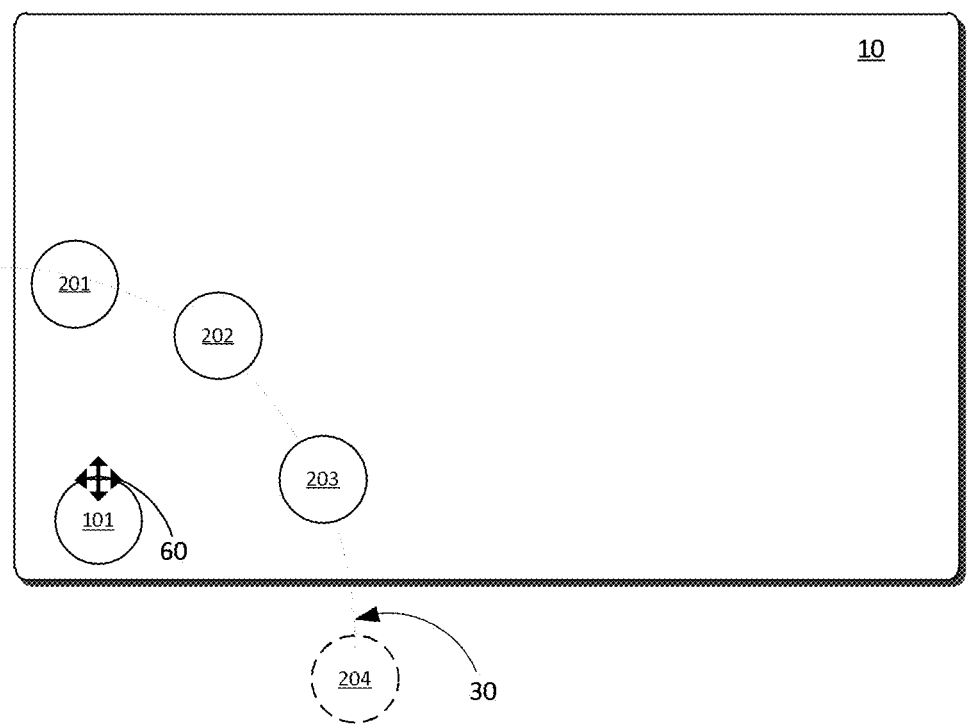

According to the FIG. 6, the central element (101) or any other interface element located at this moment in the central area (100), can be transferred to any screen zoo point by means of the corresponding user interaction (60). The mentioned interaction can be fulfilled by means of the longer selection retention of the element icon (101) and its movement to the necessary point on a screen, for example, to the opposite corner, as it is shown on a FIG. 7. A rebuilding of virtual elliptic arches direction, on which elements of an auxiliary area (200) are located, is done automatically 205 depending on a screen point (10), where the central element has been moved (101).

A user interaction can be done also by means of mechanic input means, for example a mouse manipulator, keyboard, trackball, stylus, joystick, and etc. Additionally, a user interaction with an interface can by done by means of a vocal input. For example, as it is shown in the U.S. Pat. No. 8,121,842, pub. 21, Feb. 2012.

While moving the element (101) of the central area (100), an unwinding of one or more auxiliary areas shown at this moment could take place. When interface determines that the element (101) has been assigned to a specific point on the screen, one or more auxiliary areas, which were opened before the central element (101) transition, could be expanded (displayed) back.

Figure 8:
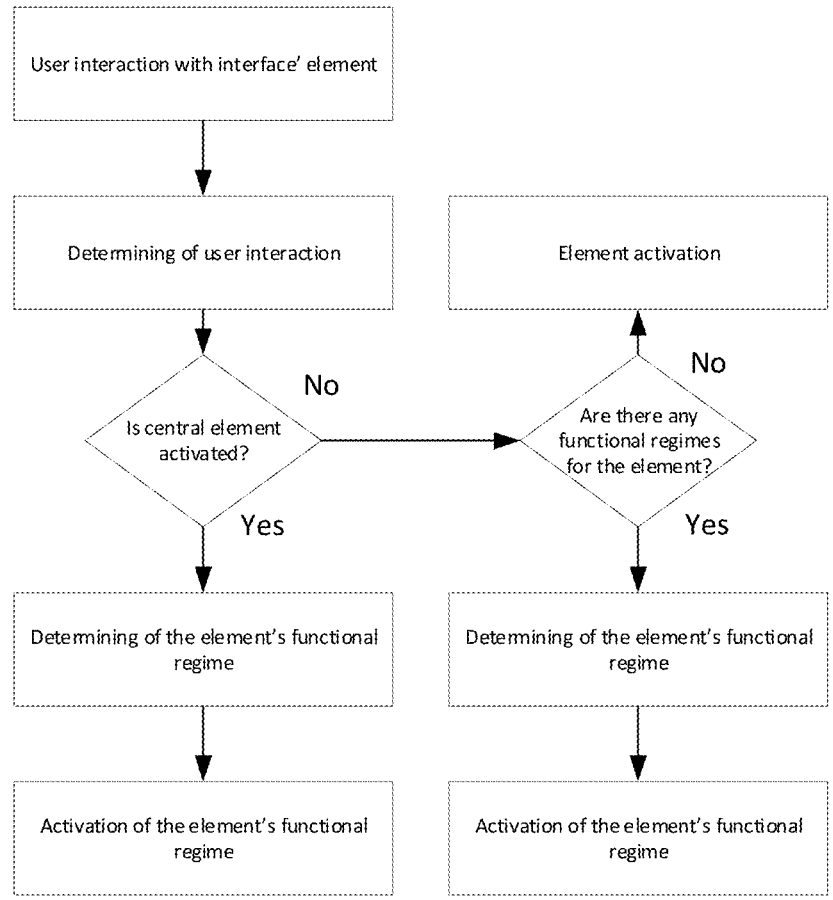
FIG. 8 illustrates schematic diagram of interface functional modes activation.

The FIG. 8 represents a general schematic diagram of activation of the functional mode of interface elements. In particular, the central element (101) or any other element, located in the central area (100), has several functional modes that are activated in response to the corresponding user interaction.

With a single pressure or click to the central element (101), an interface tree transition could be done, and a representation of given nesting level of interface or, if transition through a nesting tree is impossible, a hiding of all displayed on screen elements, except the central root element (101), can take place. During a long pressure on element (101), it can be moved on a device screen or additional functions can be activated.

Figure 9:
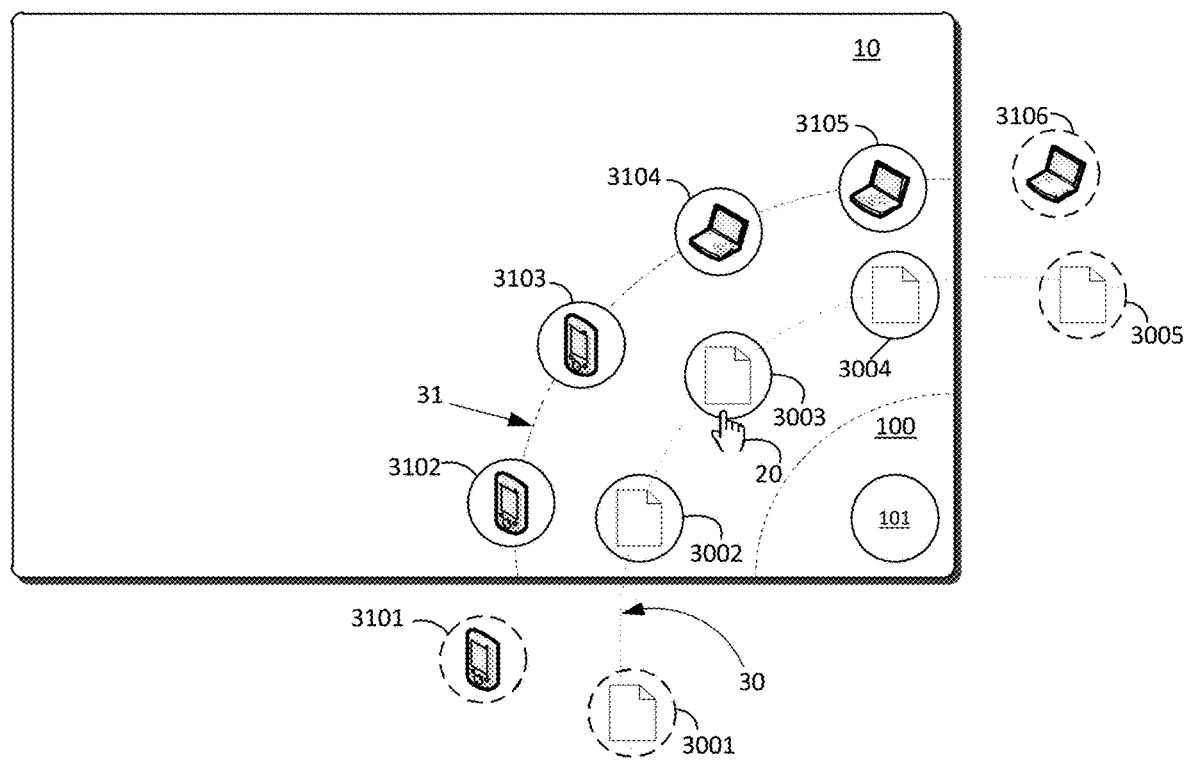
FIG. 9-FIG. 10 illustrate a principle of file transfer by means of a declared interface.
Figure 10:
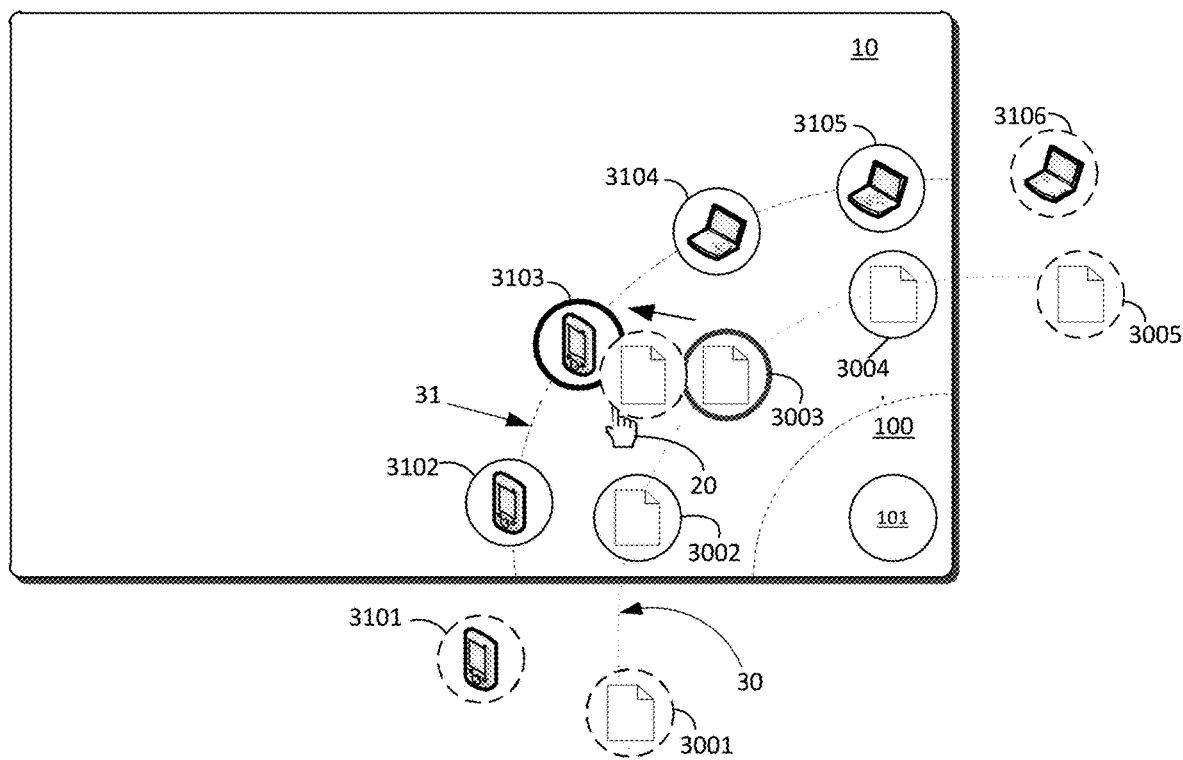

FIG. 9-FIG. 10 represent an example of interface showing a construction of 2 auxiliary areas, each of them contains a number of elements with the final conditions, not having hierarchical connections to each other. For example, one can show a function of files transfer (3001)-(3005) to different devices (3101)-(3106). On the first virtual arch (30) a multitude of different files are displayed, on the second arch (31) representations of icons of different devices are displayed, which provides an exchange of data. Data transmission can be realized by means of data transmission network, wired and/or wireless type, for example LAN (Ethernet), WAN, WLAN, Wi-Fi, Wi-Fi Ad Hoc, Wi-Fi Direct, cellular (2G; 2.5G; 3G; 4G; 5G generations), Bluetooth, Bluetooth Low-energy, IrDa, NFC, etc.

File transmission can be fulfilled by means of user interaction recognition (20) with a necessary element, in particular (3003), and its movement (FIG. 10) to the device icon (3103), on which it has to be transmitted.

A quantity of devices shown on the arch 31 is also unlimited. Additionally, a device icon lighting could be used if it is in an active mode (connection established) or darkening of icon if the device is not available.

Figure 11:
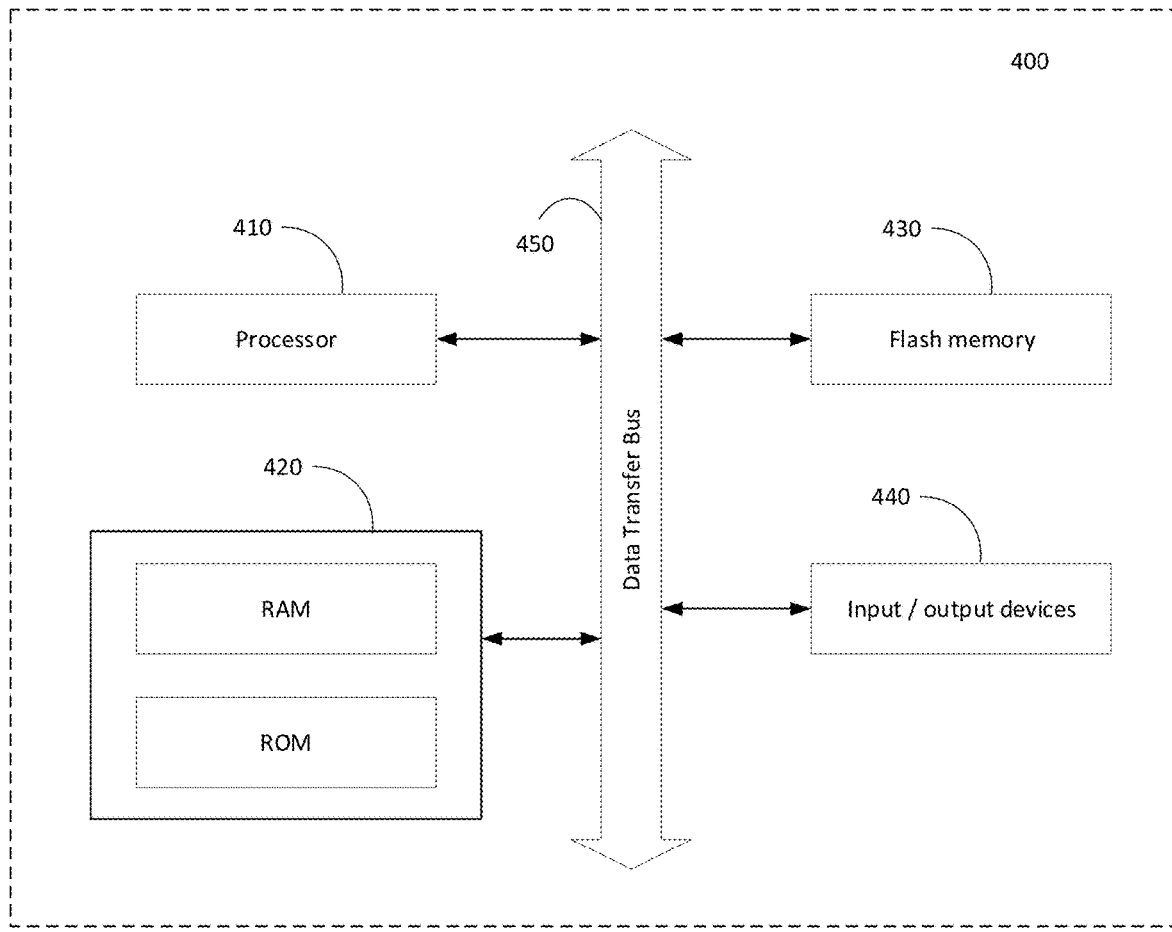
FIG. 11 illustrates a general device view, where a declared interface is realized.

The FIG. 11 represents a general example of the device design (400), applicable for a building of the declared graphical interface. In general, this device (400) contains unified by a common bus (450), at least one processor (410), a memory (420) (RAM, ROM), flash-memory (430) (NAND Flash, $EEPROM_{hT.n.}$), tools for input/output (440), each can represent different interfaces (USB, PS/2, Ethernet, COM, Jack Audio, Lightning and etc.), data input (keyboard, microphone, sensor display, joystick, a manipulator of a mouse type, trackball, and etc.), data output (a display, speaker system, projector, etc.). In some variants, the device construction (400) may vary and include additional constructive elements.

The represented data in this application discloses preferable implementations to apply the declared invention and shall not be used as limiting factor for all others or particular ways of its realization being beyond the scope of claimed rights which shall be obvious for a specialist in this subject filed.

The invention claimed is:

1. A system for controlling an electronic device using a radial graphical user interface, comprising:
   at least one processor;
   at least one memory which contains machine-readable instructions which, when executed by at least one processor, fulfill the following:
   generates radial interface, representing a main central zone, containing at least one interface element and at least one auxiliary zone with interface elements located on elliptic arch in relation to the main central zone, providing that the mentioned central zone interface element is hierarchically related at least to the interface elements of one of auxiliary zones and represent a higher interface tree level consisting of N nodes, and auxiliary zone elements correspond to the interface elements of the following lower level;
   determines a user interaction with the interface element in an auxiliary zone;
   executes displacement of the mentioned activated interface element to the central zone; and
   displays one or more interface elements of the following level of hierarchy, bound with the mentioned activated element of the auxiliary zone, on elliptic arch of the auxiliary zone, or perform an action related to the mentioned interface element,
   wherein when activating element in central zone a transition to the higher level of interface hierarchy is executed, except when the element is already in the highest hierarchy level; and
   wherein an interface central element contains several functional modes depending on type of user interaction with the mentioned element.

2. The system according to claim 1, wherein interface elements are selected from a group containing at least program applications, files, directories, settings, action functions or their combinations.

3. The system according to claim 1, wherein the auxiliary radial zone is executed with a possibility to move its elements along an arch relative to the central zone.

4. The system according to claim 1, wherein the interface element located in the central zone can be moved to any point of the device screen.

5. The system according to claim 1, wherein a quantity of simultaneously displayed interface elements in auxiliary zone is determined at least on a basis of screen resolution.

6. The system according to claim 1, wherein when activating element in central zone a transition to the higher level N of interface hierarchy is executed.

7. The system according to claim 6, wherein the building of auxiliary zone is executed corresponding to the selected level N of interface hierarchy of central zone element, wherein the interface central element contains several functional modes depending on type of user interaction with the mentioned element.

8. The system according to claim 6, wherein the interface central element contains several functional modes depending on type of user interaction with the mentioned element.

9. The system according to claim 8, wherein one of modes performs hiding or showing of all auxiliary zones of radial interface displayed on the screen in response to the user interaction.

10. The system according to claim 8, wherein the user interactions are fulfilled by means of a manipulator of a mouse type, or by sensor display' touch, or by means of keyboard.

11. A method for controlling an electronic device using a radial graphical user interface, comprising stages:
   generation a radial interface representing a main central zone containing at least one interface element and at least one auxiliary zone with interface elements, which are located on elliptic arches in relation to the central zone providing that the 305 mentioned element of central zone is hierarchically bound at least with the elements of interface of one of auxiliary zones, and represents a higher level of interface tree consisting from N nodes and elements of auxiliary zone corresponds to the interface element of the following lower level;
   determining user interaction with the interface element of auxiliary zone;
   executing displacement of the mentioned activated interface element to the central zone; and
   displaying of one or more interface elements of the following hierarchy level N, bound with the mentioned element of the auxiliary zone, on elliptic arch of the auxiliary zone, or perform an action related to the mentioned element of interface,
   wherein when activating element in central zone a transition to the higher level of interface hierarchy is executed, except when the element is already in the highest hierarchy level; and
   wherein an interface central element contains several functional modes depending on type of user interaction with the mentioned element.

12. The method according to claim 11, wherein the interface elements are selected from a group containing at least program applications, files, directories, adjustments, action functions and or their combinations.

13. The method according to claim 11, wherein the radial auxiliary zone is 320 performed with a possibility to move elements along arch relative to the central zone.

14. The method according to claim 11, wherein the interface element, located in the central zone can be moved to any point of a device screen.

15. The method according to claim 11, wherein the quantity of simultaneously displayed interface elements in an auxiliary zone is determined on a basis of at least a screen resolution.

16. The method according to claim 11, wherein during central zone element activation a transition to the higher level N of interface hierarchy is executed.

17. The method according to claim 16, wherein a building of auxiliary zone is executed corresponding to the selected level N of interface hierarchy of central zone element.

18. The method according to claim 16, wherein the interface central element contains several functional modes depending on a type of a user interaction with the mentioned element.

19. The method according to claim 18, wherein one of the modes executes hiding or showing of all auxiliary zones of radial interface displayed on the screen in response to the user interaction.

20. The method according to claim 19, wherein the user interaction is performed by means of a manipulator of a mouse type, or by sensor display' touch, or by keyboard or by a vocal input.

\* \* \* \* \*